US010596508B2

(12) United States Patent
Krogsgaard

(10) Patent No.: US 10,596,508 B2
(45) Date of Patent: Mar. 24, 2020

(54) AUTOMATIC FILTER CLEANING SYSTEM

(71) Applicant: Producteers A/S, Hadsten (DK)

(72) Inventor: Holger Krogsgaard, Hadsten (DK)

(73) Assignee: PRODUCTEERS A/S, Hadsten (DK)

( * ) Notice: Subject to any disclaimer, the term of this patent is extended or adjusted under 35 U.S.C. 154(b) by 196 days.

(21) Appl. No.: 15/634,722

(22) Filed: Jun. 27, 2017

(65) Prior Publication Data

US 2017/0291130 A1    Oct. 12, 2017

Related U.S. Application Data

(63) Continuation of application No. PCT/DK2015/050410, filed on Dec. 22, 2015.

(30) Foreign Application Priority Data

Jan. 2, 2015    (DK) .................................. 2015 00001

(51) Int. Cl.
| | | |
|---|---|---|
| *B01D 46/00* | (2006.01) | |
| *A47L 9/20* | (2006.01) | |
| *A47L 11/40* | (2006.01) | |
| *A47L 9/04* | (2006.01) | |
| *A47L 9/08* | (2006.01) | |
| *A47L 9/10* | (2006.01) | |

(52) U.S. Cl.
CPC ............ *B01D 46/0068* (2013.01); *A47L 9/20* (2013.01); *A47L 11/4033* (2013.01); *B01D 46/0067* (2013.01); *A47L 9/0461* (2013.01); *A47L 9/08* (2013.01); *A47L 9/10* (2013.01); *A47L 11/4027* (2013.01); *B01D 2279/55* (2013.01)

(58) Field of Classification Search
CPC ............... B01D 46/00; B01D 46/0068; B01D 2279/55; B01D 46/0067–0071; A47L 11/4033; A47L 11/4027; A47L 9/20; A47L 9/0461; A47L 9/10; A47L 9/08
USPC ................... 55/282–305; 210/333.01, 333.1; 251/318–334
See application file for complete search history.

(56) References Cited

U.S. PATENT DOCUMENTS

| | | | | |
|---|---|---|---|---|
| 5,139,046 A | * | 8/1992 | Galli | ..................... G05D 16/107 137/505.42 |
| 2005/0001185 A1 | * | 1/2005 | Everingham | .......... F16K 31/047 251/69 |
| 2006/0083628 A1 | * | 4/2006 | Kanai | .................. F04B 27/1009 417/269 |
| 2007/0209150 A1 | | 9/2007 | Gogel | |

(Continued)

FOREIGN PATENT DOCUMENTS

| | | |
|---|---|---|
| DE | 102011006361 | 10/2012 |
| GB | 1259557 | 1/1972 |
| WO | 2011003441 | 1/2001 |

*Primary Examiner* — T. Bennett McKenzie
(74) *Attorney, Agent, or Firm* — Lathrop GPM LLP

(57) ABSTRACT

An automatic filter cleaning system, e.g., for cleaning a filter in a vacuum cleaner. The cleaning system has an electrical motor that drives/rotates, directly/indirectly, a piston which directly/indirectly opens a filter cleaning valve. The filter cleaning valve may open for a filter cleaning back flow air stream that thus cleans the filter. The piston is spring loaded and a piston guide ensures that the energy accumulated in the spring and piston is released during the rotation of the piston, thereby shortly opening the filter cleaning valve.

11 Claims, 10 Drawing Sheets

(56) References Cited

U.S. PATENT DOCUMENTS

2011/0175006 A1* 7/2011 Dolenti .................. F16K 31/04
  251/129.11
2012/0137467 A1 6/2012 Treitz
2014/0237763 A1* 8/2014 Holsten .................... A47L 9/20
  15/352

* cited by examiner

AUTOMATIC FILTER CLEANING SYSTEM

CROSS-REFERENCE TO RELATED APPLICATIONS

This application is a continuation of International Patent Application No. PCT/DK2015/050410, filed Dec. 22, 2015, which claims the benefit of priority to Danish Patent Application No. PA201500001, filed Jan. 2, 2015, each of which is incorporated herein by reference in its entirety.

FIELD OF THE INVENTION

The present invention relates to an automatic filter cleaning system. The cleaning system may be used with a vacuum cleaner. The filter cleaning system cleans the filter by blowing air backwards through the filter ("back flow filter cleaning").

BACKGROUND OF THE INVENTION

Filter cleaning is becoming more important as the requirements regarding filtration levels are increased. Thus, cleaning the filter becomes important in order to maintain a high air flow through the filter (i.e. to avoid that the filter is getting clogged).

Today, several systems are available. WO 2008/014794 A1 discloses a system with a large solenoid opening a valve positioned above the filter. When opening the valve, the air flows into the tank due to the effect of under pressure. Thus, the filter is thereby cleaned by "blowing" the dust into the tank. Generally, this system has proven to be effective, but complex and expensive control electronics are required.

WO 2010/028787 A1 discloses another system, said system being effective, but highly complex and expensive as it requires 2 filters, an electrical actuated direction valve and a solenoid valve to open for the "back flow" in order to clean the filter. Furthermore, complex and expensive control electronics are needed to render the system operational.

GB 1 259 557 A discloses an air filtering installation comprising a motor, which rotates a hammer, said hammer being fastened to a leaf-spring. During the rotation, the hammer slides along the guide surface and edge, thus resulting in the conversion of the rotational movement of the hammer into an axial movement of said hammer. The hammer controls the tension of the leaf-spring, and thereby the opening of the plate valve. However, leaf-springs possess some disadvantages, i.e., proper adjustment is difficult, and, thus, alternatives are needed.

As apparent from the above, simple, effective and less expensive filter cleaning systems are needed. By the present invention, such is provided.

OBJECT OF THE INVENTION

It is an object for the present invention to provide a back flow automatic filter cleaning system being simple, durable and cost-effective. Furthermore, the system of the present invention neither incorporates nor require any control electronics.

DESCRIPTION OF THE INVENTION

In a first aspect, the present invention relates to automatic filter cleaning systems, said system comprising an electrical motor configured to drive or rotate, directly or indirectly, a piston which is configured to control the compression of one or more compression spring(s) and one or more filter cleaning valve(s) configured to open for one or more filter cleaning back flow air stream(s) to flow into one or more filter(s), where said one or more filter cleaning valves are configured to be activated, directly or indirectly, by the piston and a piston guide, whereby the piston guide and the one or more compression spring(s) are arranged to convert the rotary movement of the piston into an axial movement of the piston.

According to the invention, the piston is spring-loaded by one or more compression spring(s). The axial movement of the piston determines the compression level of the one ore more spring(s). The one or more filter cleaning valve(s) may be configured to open for a filter cleaning back flow air stream in order to clean the filter. The filter cleaning valve(s) may suitably be configured to be activated by the piston. A piston guide ensures the conversion of the rotary movement of the spring-loaded piston into an axial movement. When the piston hits the filter cleaning valve, it opens for a short period of time, thus creating a "hammer effect" that will overcome the flow forces acting on the filter cleaning valve.

In another embodiment according to the invention, the piston comprises a piston slide feature that is configured to only slide on the piston guide sliding surface during a spring compression phase of one rotation of the piston.

Accordingly, the piston is provided with a piston slide feature adapted to slide on the piston guide sliding surface provided at the piston guide.

In one preferred embodiment according to the invention, the piston comprises a piston slide feature that is configured to only slide on the piston guide sliding surface during a spring compression phase of one rotation of the piston.

Accordingly, the piston guide is provided with a piston guide non-sliding surface. When the piston slide feature, during rotation, has reached the piston guide non-sliding surface, the energy accumulated in the compression spring and piston is released. Accordingly, the piston moves down and hits the filter cleaning valve causing the filter cleaning valve to open swiftly. Depending on the rotation speed of the electrical motor and the number of sliding/non-sliding surfaces on the piston guide, the time interval between each filter cleaning can be controlled by simple mechanical means.

By way of example, the time interval between each filter cleaning may be 20-30 seconds. Moreover, if customers do not want to use the automatic filter cleaning system a simple inexpensive switch can be worked in to stop the electrical motor.

The piston guide non-sliding surface may be a steep surface on which the piston cannot slide.

In another embodiment according to the invention, the outer part of the piston is made of a plastic material and has a piston core made of a material with higher density, e.g., a metal.

The plastic material is suitably selected from any conventional plastic material suited for the purpose of this invention. Representative, but non-limiting, examples include PET (polyethylene terephthalate), PE (polyethylene), HDPE (high-density polyethylene), PVC (polyvinyl chloride), LDPE (low-density polyethylene), PP (polypropylene), PS (polystyrene), PE/ABS (polyethylene/acrylonitrile butadiene styrene), and PC/ABS (polycarbonate/acrylonitrile butadiene styrene). The metal may suitably be selected from iron or titanium and various alloys thereof. The weight of the piston shall be sufficient to generate a desired and suitable "hammer effect" of the piston.

The electrical motor is preferably an alternating current (AC) synchronous motor. Furthermore, the motor may preferably be connected directly to the main power supply. Even more preferred, the motor is made such that is does not require any control electronics to be operational for the purpose of the present invention.

The electrical motor to be used in accordance with this invention may be equipped with a built-in gearbox configured to reduce speed and increase torque. One well-known example of an AC motor is the kind provided by a conventional vacuum cleaner.

In another embodiment according to the invention, the filter cleaning valve is made of a plastic material. Suitable plastic materials are mentioned above. The plastic material selected should have sufficient sealing properties.

The weight of the piston may be larger than 150 g, depending on the application. Test has shown that this weight in most applications creates sufficient weight to obtain the necessary "hammer effect", by which the piston is able to open the filter cleaning valve swiftly and effectively.

In yet another embodiment according to the invention, the compression spring(s) have a combined spring constant larger than 3 N/mm. Hereby, sufficient energy can be accumulated in the spring and be released in order to open the filter cleaning valve.

It may be an advantage that a return spring is arranged to facilitate that the piston is returned to its initial position (Position 1) by pushing toward a distal end of the piston. Hereby, return of the piston can be achieved by using simple mechanical means.

It may be beneficial that the return spring is arranged at the bottom portion of the piston guide. Hereby, a simple and reliable construction can be provided.

It may be advantageous that the piston slide feature protrudes from the piston and extends radially with respect to the longitudinal axis of the piston.

The invention is not limited to the above-described, but may be modified in various ways.

DESCRIPTION OF THE DRAWING

Preferred embodiments of the present invention are described with reference to the accompanying drawings, wherein.

DETAILED DESCRIPTION

Figure 1:
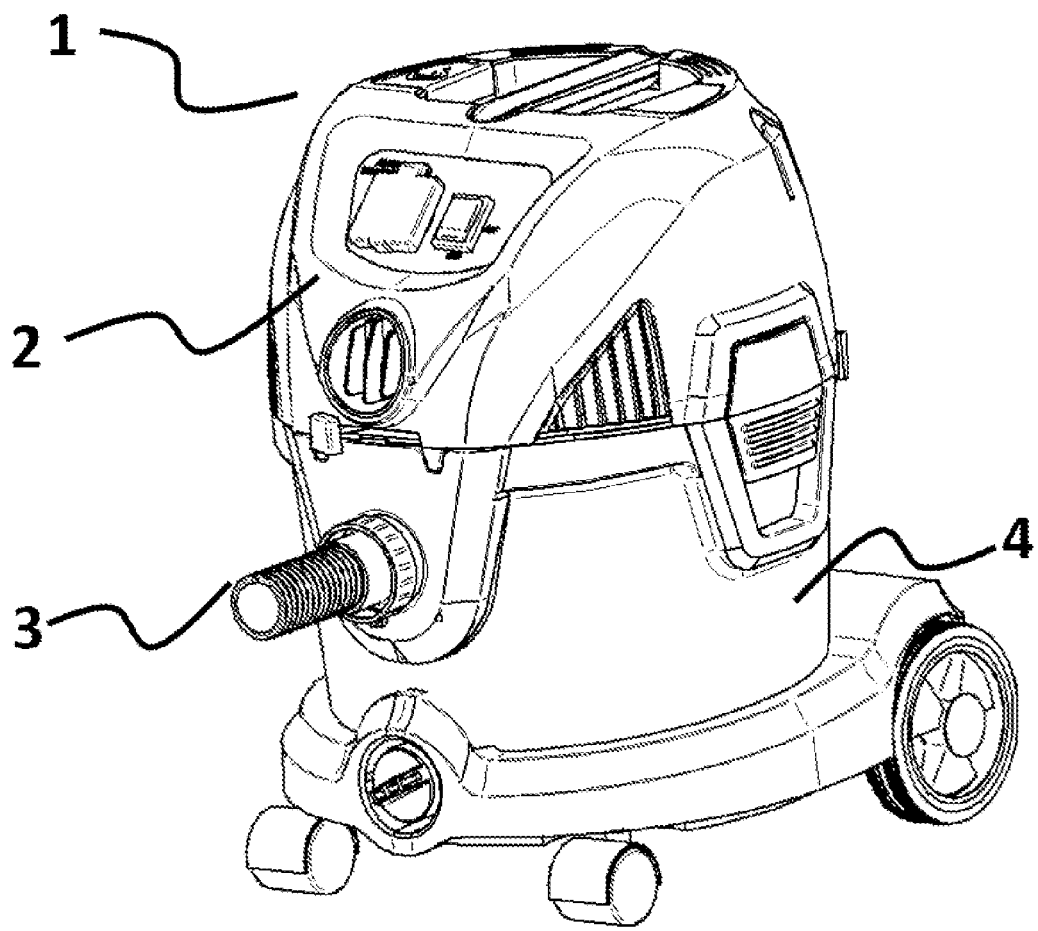
FIG. 1 shows a vacuum cleaner in ISO view.

FIG. 1 illustrates a vacuum cleaner 1 in an ISO view consisting of a head 2 and a tank 4 with a suction hose 3.

Figure 2:
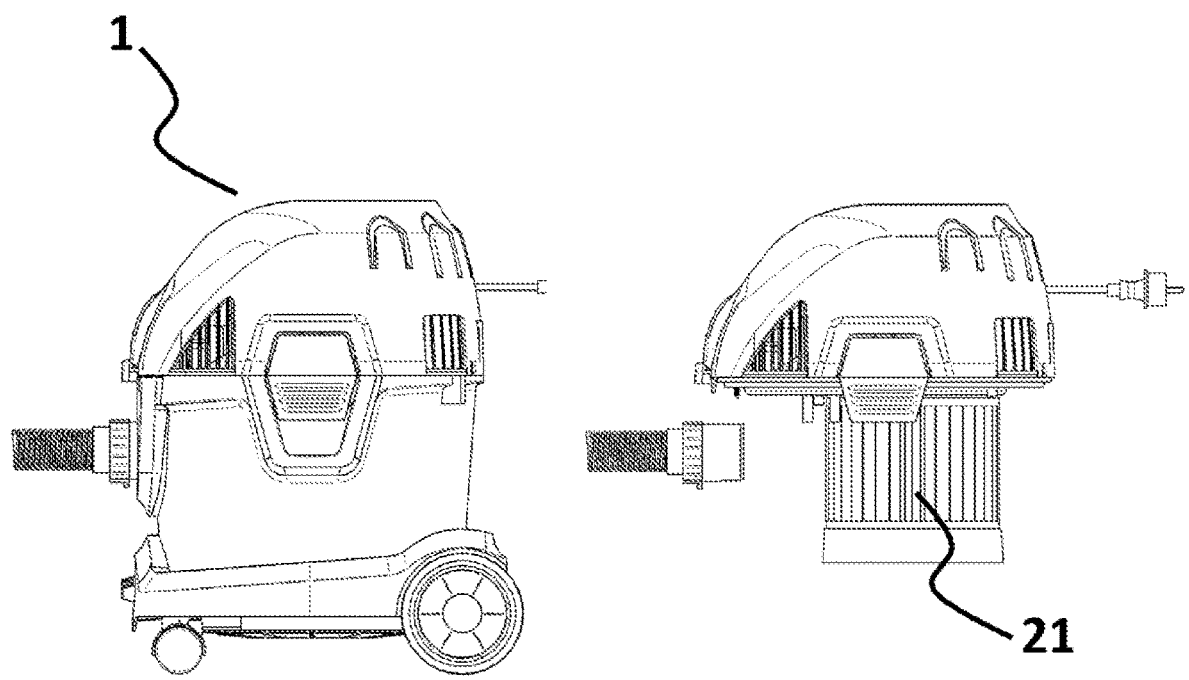
FIG. 2 shows a vacuum cleaner in side view with and without tank.

FIG. 2 illustrates the vacuum cleaner 1 without the tank 4, thereby showing the filter 21, which, during suction of dust, will become clogged, and thus, may need to be cleaned in order restore sufficient air flow/suction of the vacuum cleaner 1. The finer the dust, the faster the filter 21 gets clogged, resulting in a decrease of suction.

Figure 3:
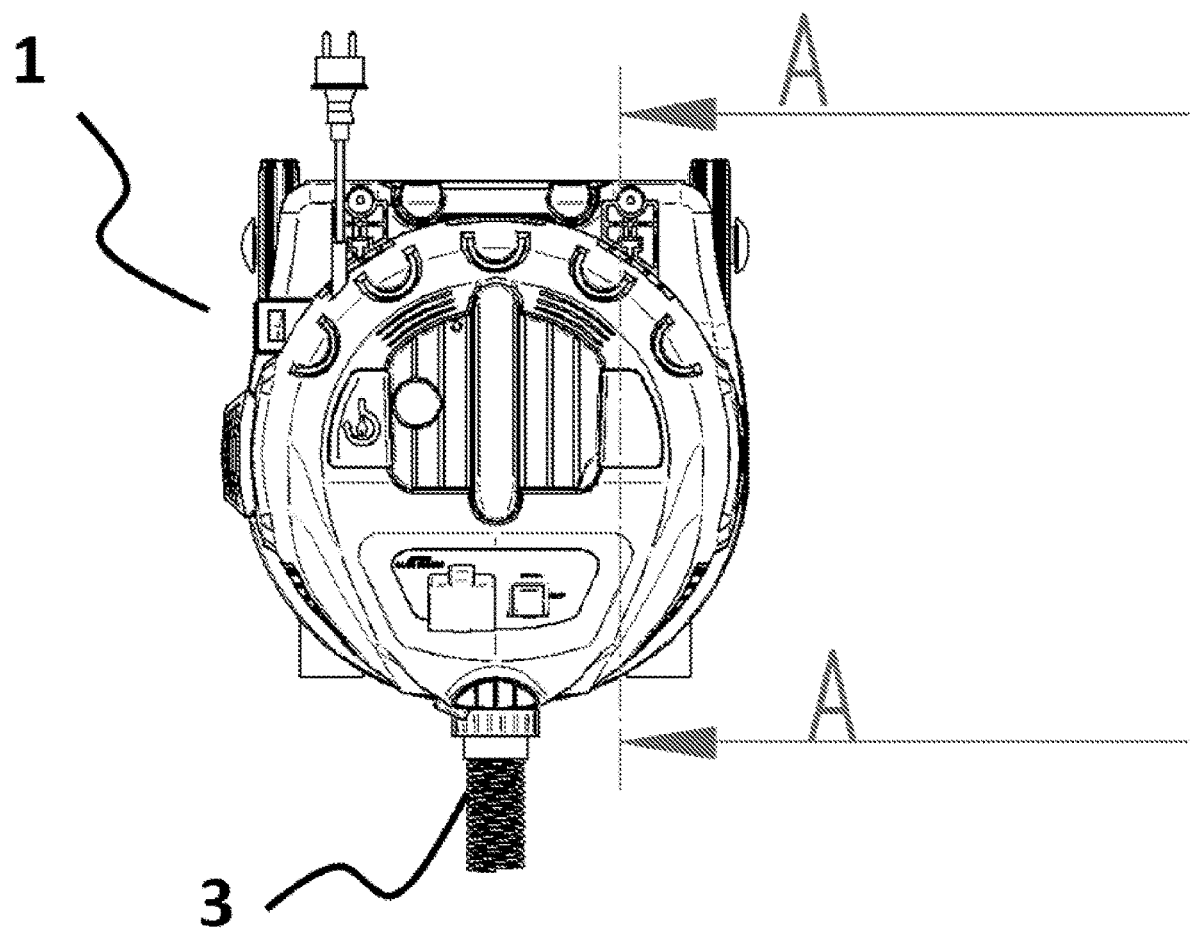
FIG. 3 shows a vacuum cleaner top view with indication for cross sectional view.
Figure 4:
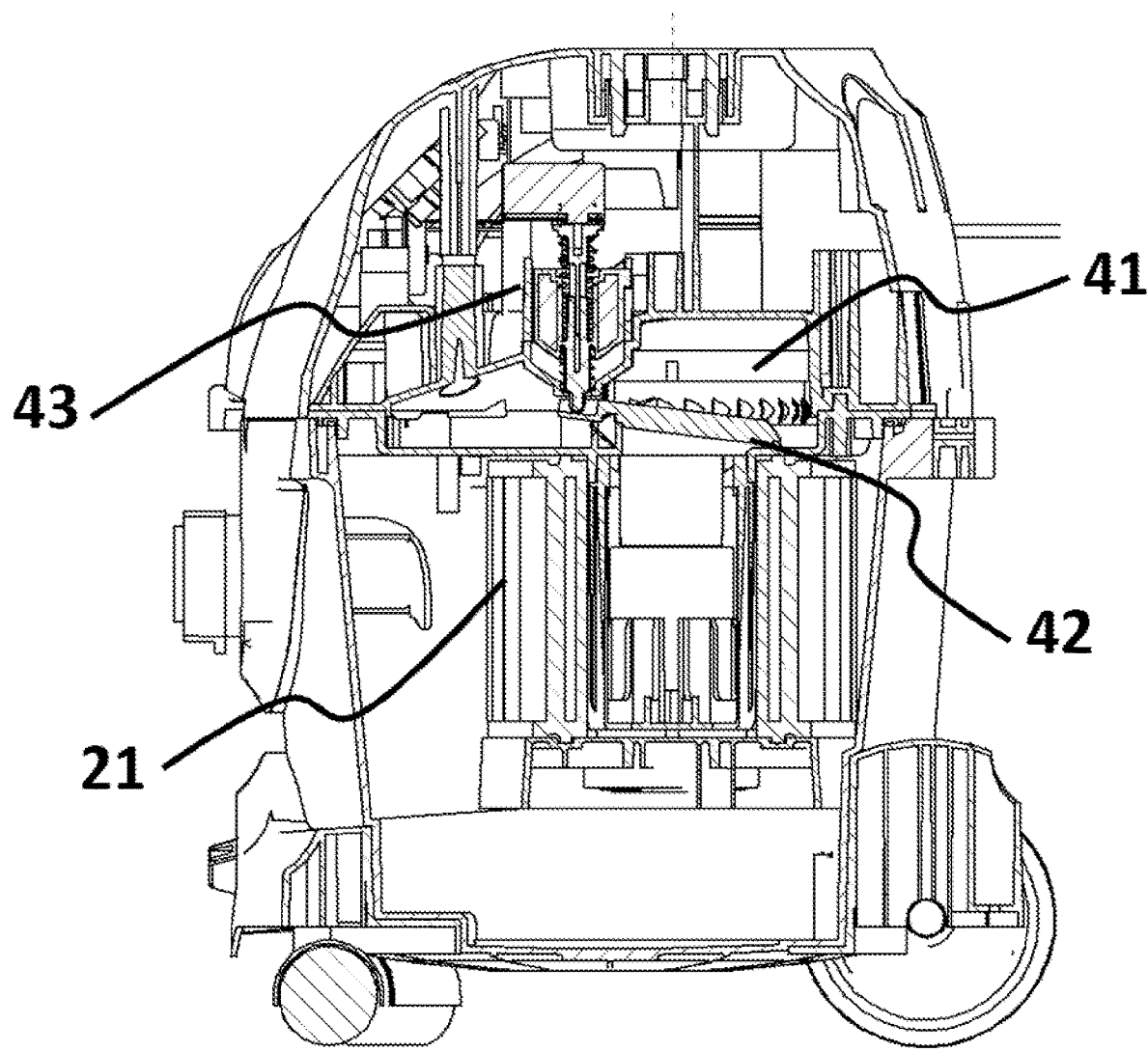
FIG. 4 shows the cross-sectional view defined in FIG. 3.

FIG. 3 shows a top view of the vacuum cleaner 1 showing a section cutting plane A-A indicated in FIG. 4.

In FIG. 4, the cross sectional view A-A of FIG. 3 is shown. The vacuum cleaner motor 41 creating the air suction in the vacuum cleaner 1 is illustrated. The filter 21 filters the air, before it is exhausted. The filter cleaning valve 42 is also shown. When the filter cleaning valve 42 opens, the filter cleaning back flow air stream flows into the filter and backwards through the filter due to under pressure inside the tank. Thus, the filter 21 is cleaned. A filter cleaning actuator 43 is also shown.

Figure 5:
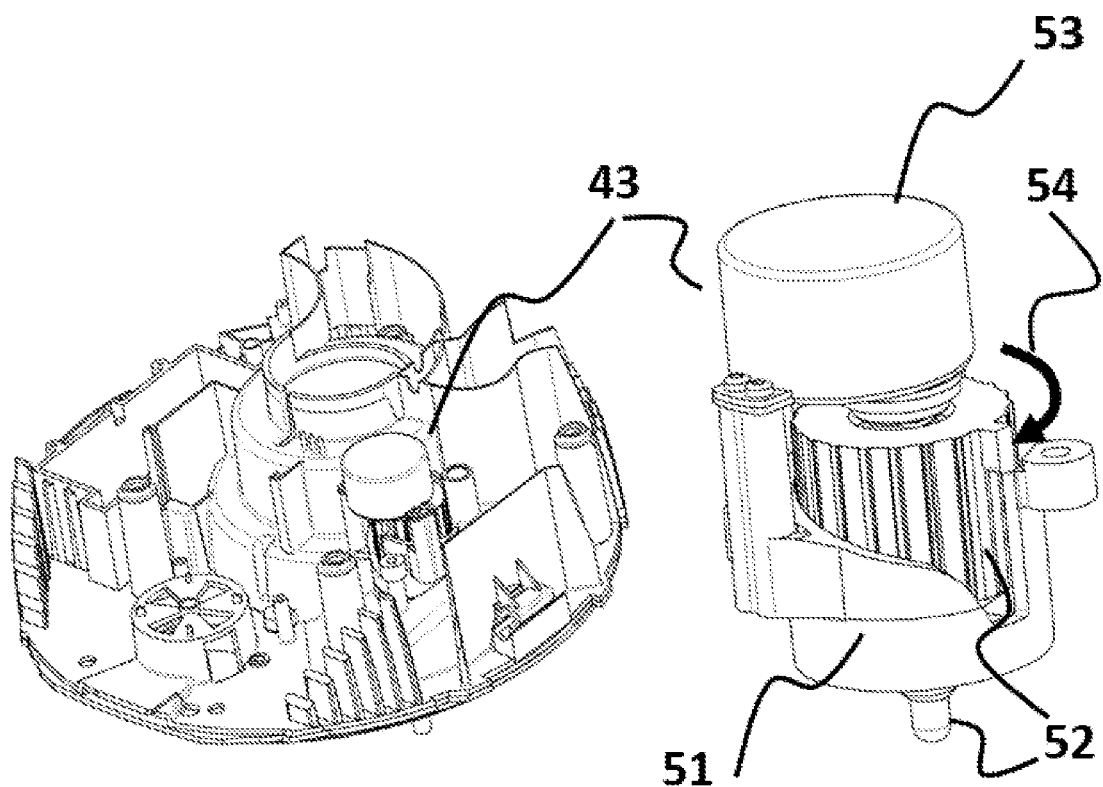
FIG. 5 shows internal parts of the vacuum cleaner and the filter cleaning valve actuator.

In FIG. 5, the head 2 is shown. Several parts have been omitted to better illustrate the filter cleaning actuator 43. The filter cleaning actuator 43 is composed of an electrical motor 53, a piston 52 and a piston guide 51. The shaft of the electrical motor 53 rotates the piston 52 in the direction shown by the piston rotation direction arrow 54.

Figure 6:
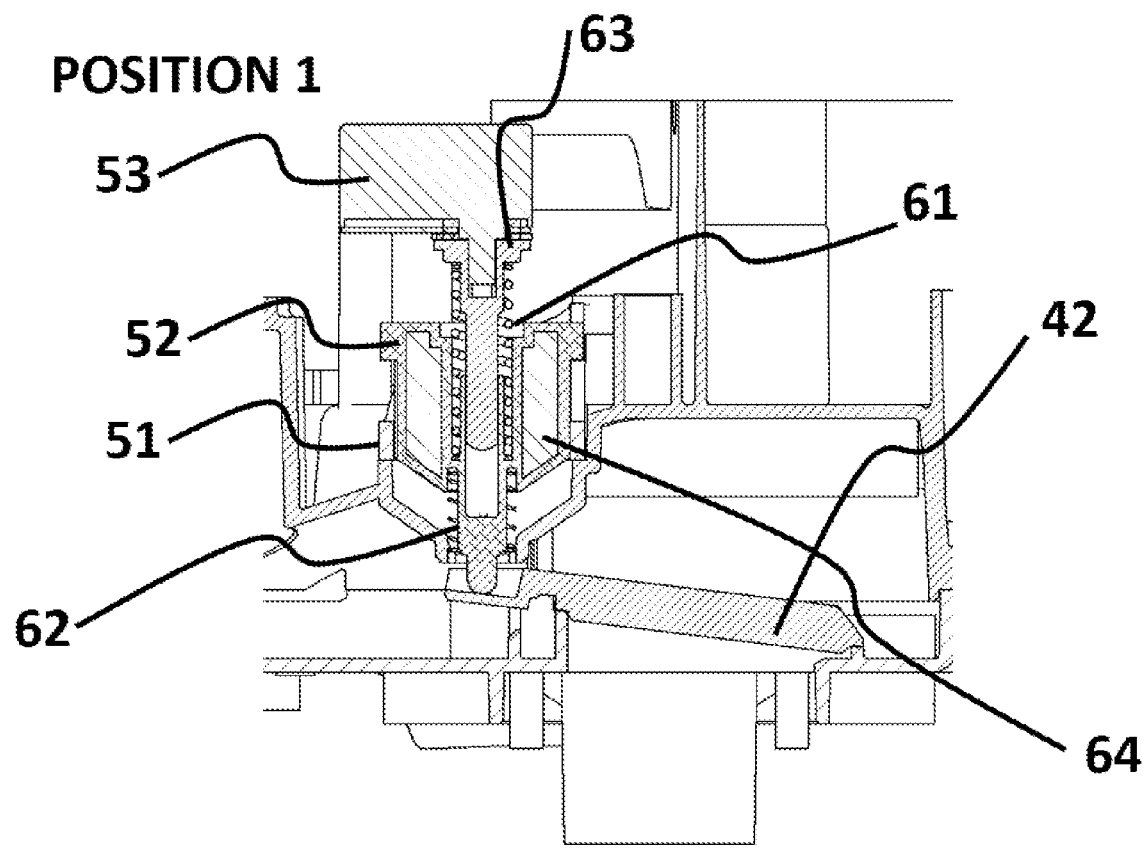
FIG. 6 shows the filter cleaning system in Position 1.

In FIG. 6, Position 1 for the piston 52 in the filter cleaning actuator 43 is shown. In Position 1, the compression spring 61 is not compressed. A return spring 62 is also shown, facilitating the return to Position 1 of the piston 52. The piston 52 may have an inner piston core 64 made of a higher density material to increase the weight of the piston, and thereby the impact of the piston 52 when hitting/opening the filter cleaning valve 42. A piston shaft 63 connected to the shaft of the electrical motor 53 drives the piston 52. In Position 1 of the piston 52, the filter cleaning valve 42 is closed.

Figure 7:
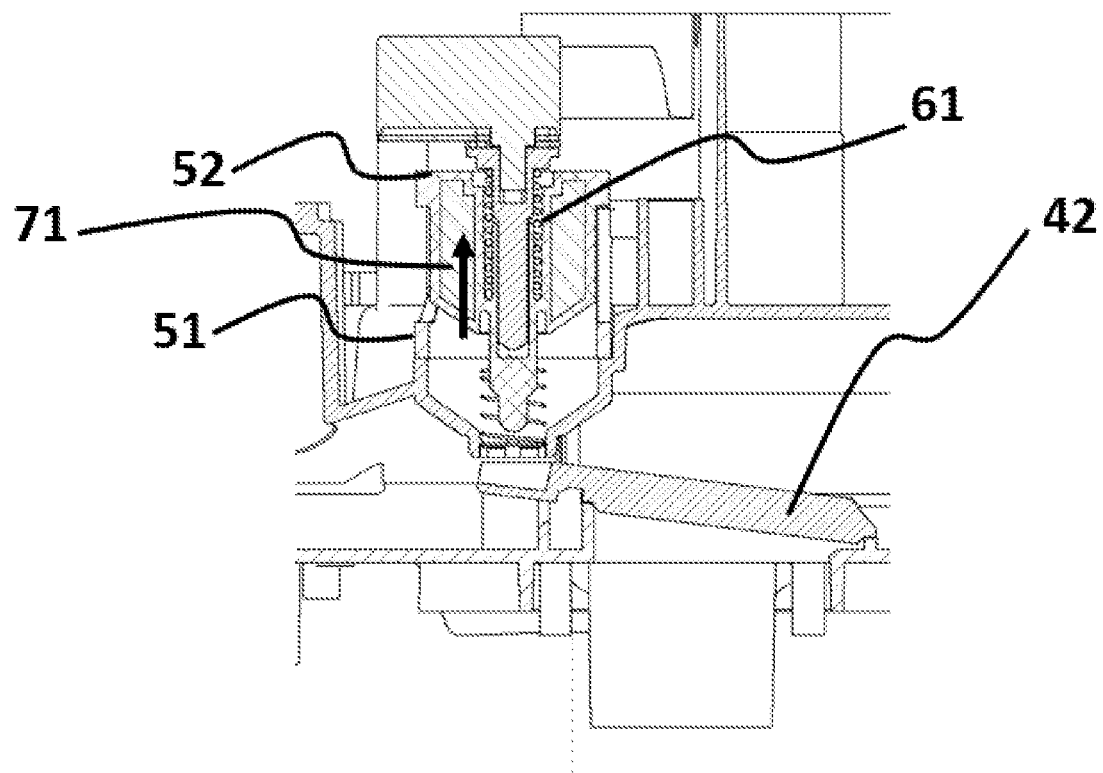
FIG. 7 shows the filter cleaning system in Position 2.

In FIG. 7, Position 2 for the piston 52 is shown. The compression spring 61 is now fully compressed, as the Piston 52 has moved up (shown by direction arrow 71) due to the axial rotation of the piston 52 and the shape of the piston guide 51. The filter cleaning valve 42 is closed.

Figure 8:
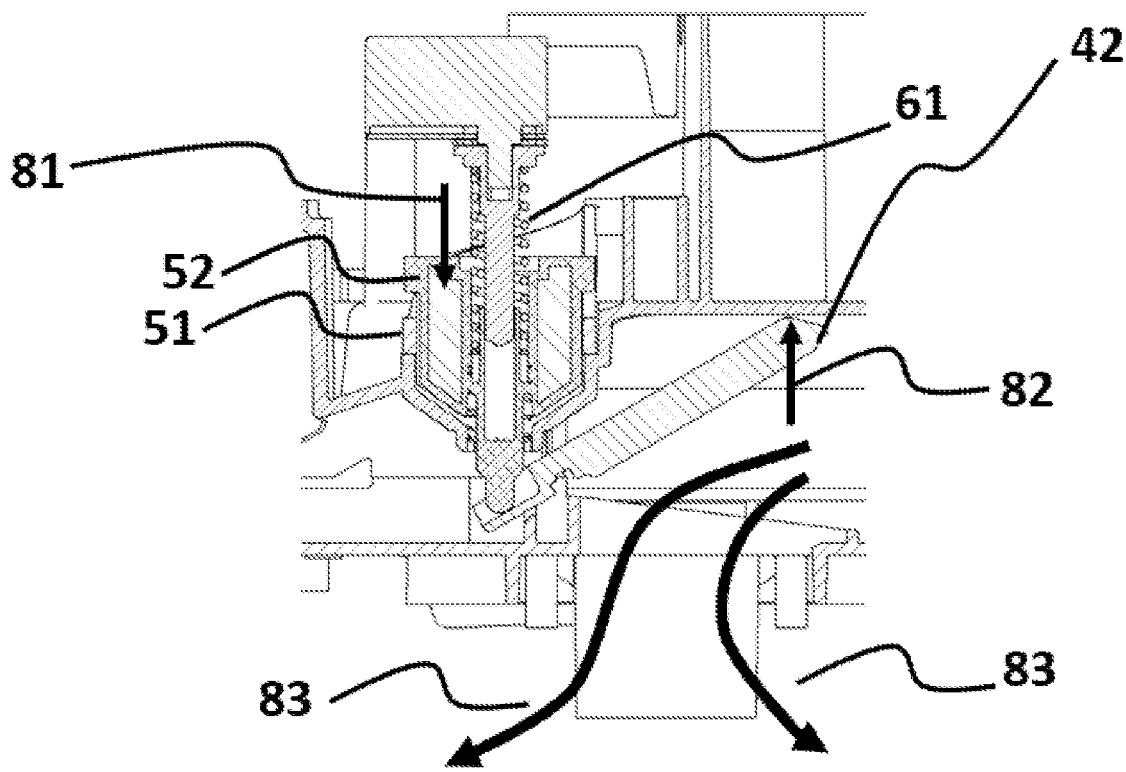
FIG. 8 shows the filter cleaning system in Position 3.

In FIG. 8, Position 3 for the piston 52 is shown. The energy accumulated during the spring compression phase is now released and the piston 52 moves down (shown by direction arrow 81). Thereby, the filter cleaning valve 42 is activated and opened (show by direction arrow 82). A "hammer effect" is created by the piston 52 on the filter cleaning valve 42, forcing it to open swiftly. The filter cleaning air steam 83 enters the inside of the filter 21 swiftly and cleans the filter 21 due to the under pressure inside the tank 4. This filter cleaning operation is accomplished in a very short time and the piston 52 returns to Position 1, whereby the filter cleaning valve 42 closes.

Figure 9:
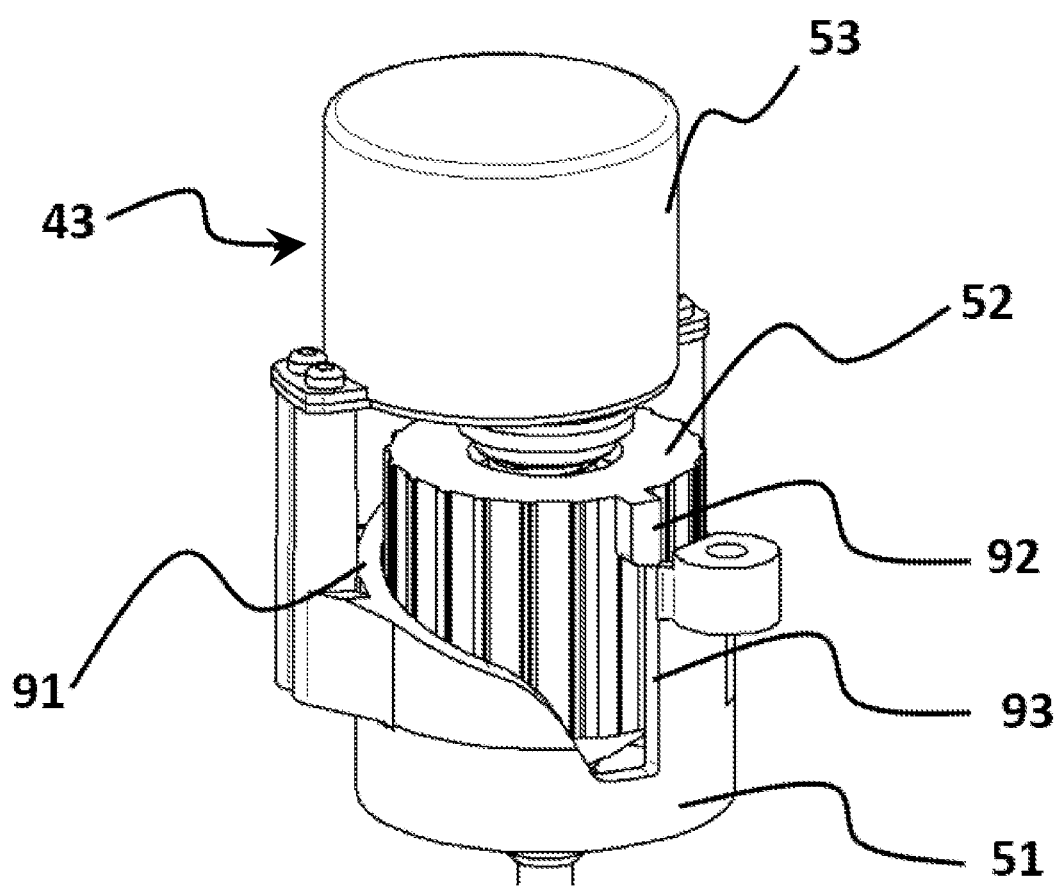
FIG. 9 shows the piston guide and piston slide.

In FIG. 9, a more detailed view of the filter cleaning actuator 43 is shown. As can be seen, the piston 52 has a piston slide feature 92 adapted to slide on a piston guide sliding surface 91 on the piston guide 51. The piston guide 51 also has a piston guide non-sliding surface 93, e.g. a steep surface on which the piston 52 cannot slide. When the piston slide feature 92, during rotation, has reached the piston guide non-sliding surface 93, the energy accumulated in the compression spring 61 and piston 52 is released, and the piston 52 moves down and hits the filter cleaning valve 42, thereby opening it swiftly. Thus, depending on the rotation speed of the electrical motor 53 and the number of sliding/non-sliding surfaces 91, 93 on the piston guide 51, the time between each filter cleaning can be controlled. In general, the period could suitably be 20-30 seconds. In the shown system, no complex control electronics are needed to control the electrical motor 53 as it just runs continuously when the vacuum cleaner (1) is turned on. If customers do not want to use the automatic filter cleaning system, a simple inexpensive switch configured to stop the electrical motor 53 can be integrated.

Figure 10:
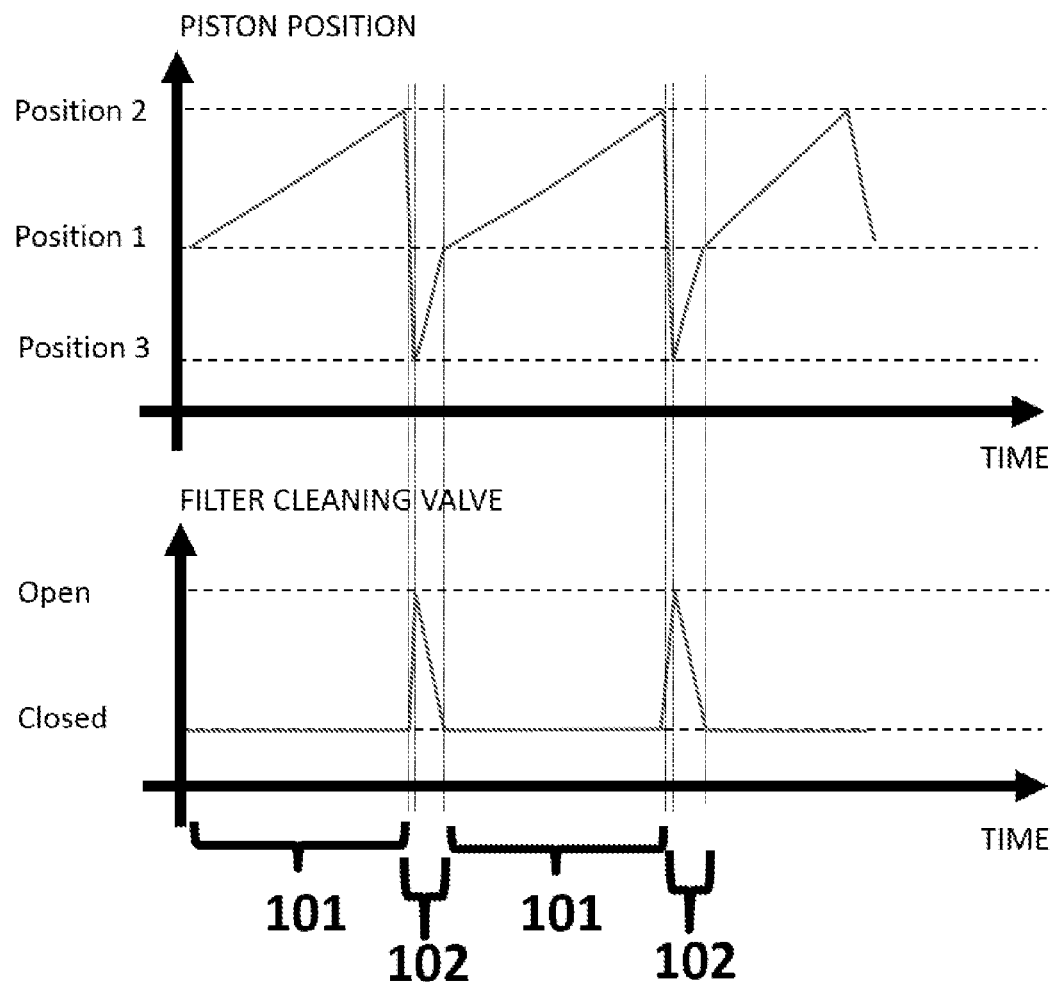
FIG. 10 shows the movement of the piston and filter cleaning valve during use.

FIG. 10 illustrates the cycle of the piston 52 and the filter cleaning valve 42. In FIG. 10, the piston 52 starts the cycle in Position 1. The filter cleaning valve 42 is closed. Due to the rotation of the piston 52, the piston will gradually compress the compression spring 61 until the maximum compression is reached in Position 2. The filter cleaning valve 42 remains closed. Thus, Position 1 through Position 2 is denoted the spring compression phase 101. The piston 52 is then released from the sliding surface 91 on the piston guide 51 and moves down to Position 3, thereby also activating/opening the filter cleaning valve 42. Due to the return spring 62 and the flow forces on the filter cleaning valve 42, the piston 51 rapidly returns to Position 1. The filter cleaning valve 42 is thereby opened swiftly and creates an impulse cleaning of the filter 21. The suction performance of the vacuum cleaner 1 is only reduced briefly. Thus, Position 2 through Position 1 via Position 3 is the spring decompression phase 102.

NOMENCLATURE

1. Vacuum cleaner
2. Head
3. Hose
4. Tank
21. Filter
41. Vacuum cleaner motor
42. Filter cleaning valve
43. Filter cleaning actuator
51. Piston guide
52. Piston
53. Electrical motor
54. Piston rotation direction arrow
61. Compression spring
62. Return spring
63. Piston shaft
64. Piston core
71. Piston direction upwards movement
81. Piston direction downwards movement
82. Filter cleaning valve open movement
83. Filter cleaning back flow air stream
91. Piston guide sliding surface
92. Piston slide feature
93. Piston guide non-sliding surface
101: Spring compression phase
102: Spring decompression phase

I claim:

1. An automatic filter cleaning system comprising:
   one or more compression springs;
   a piston configured to control the one or more compression springs;
   an electrical motor configured to continuously rotate, directly or indirectly, the piston; and
   one or more filter cleaning valves configured to open up for one or more filter cleaning back flow air streams to flow into one or more filters, where each filter cleaning valve is configured to be activated, directly or indirectly, by the piston and a piston guide surrounding the piston, wherein the piston guide and the one or more compression springs are arranged to convert rotary movement of the piston into an axial movement of the piston, wherein the piston has a protruding piston slide feature configured to slide on a piston guide sliding surface of the piston guide during the rotary movement of the piston, wherein the piston guide sliding surface is discontinuous such that the protruding piston slide feature is configured not to slide on the piston guide sliding surface during a spring decompression phase of one rotation of the piston.

2. An automatic filter cleaning system according to claim 1, wherein the protruding piston slide feature is configured to only slide on the piston guide sliding surface during a spring compression phase of one rotation of the piston.

3. An automatic filter cleaning system according to claim 1, wherein the piston has an outer part made of plastic material and a piston core made of higher density material compared to the outer part.

4. An automatic filter cleaning system according to claim 1, wherein the electrical motor is an AC synchronous motor.

5. An automatic filter cleaning system according to claim 1, wherein the electrical motor has a built-in gearbox configured to reduce speed and increase torque.

6. An automatic filter cleaning system according to claim 1, wherein the one or more filter cleaning valves are made of plastic material.

7. An automatic filter cleaning system according to claim 1, wherein a weight of the piston is above 150 g.

8. An automatic filter cleaning system according to claim 1, wherein the one or more compression springs has a spring constant larger than 3 N/mm.

9. An automatic filter cleaning system according to claim 1, wherein a return spring is arranged to facilitate the piston to be returned to an initial position by pushing toward a distal end of the piston.

10. An automatic filter cleaning system according to claim 9, wherein the return spring is arranged at a bottom portion of the piston guide.

11. An automatic filter cleaning system according to claim 1, wherein the protruding piston slide feature protrudes radially with respect to a longitudinal axis of the piston.

\* \* \* \* \*